United States Patent
Smith

(10) Patent No.: US 10,484,815 B1
(45) Date of Patent: Nov. 19, 2019

(54) MANAGING COMMUNICATIONS BASED UPON LOCATION INFORMATION ASSOCIATED WITH ELECTRONIC FILES EXCHANGED DURING THE COMMUNICATIONS

(71) Applicant: Securus Technologies, Inc., Carrollton, TX (US)

(72) Inventor: Matthew R. Smith, McKinney, TX (US)

(73) Assignee: Securus Technologies, Inc., Carrollton, TX (US)

(*) Notice: Subject to any disclaimer, the term of this patent is extended or adjusted under 35 U.S.C. 154(b) by 0 days.

(21) Appl. No.: 15/806,536

(22) Filed: Nov. 8, 2017

(51) Int. Cl.
*H04W 4/021* (2018.01)
*H04L 29/06* (2006.01)

(52) U.S. Cl.
CPC ........... *H04W 4/021* (2013.01); *H04L 63/306* (2013.01)

(58) Field of Classification Search
CPC ..... H04L 51/10; H04L 63/306; H04L 63/308; H04W 4/21; H04W 4/021
USPC ........................................ 374/70; 455/456.1
See application file for complete search history.

(56) References Cited

U.S. PATENT DOCUMENTS

| | | | | |
|---|---|---|---|---|
| 8,204,177 B2* | 6/2012 | Harper | ................. | G06Q 20/382 370/352 |
| 2008/0148397 A1* | 6/2008 | Litvin | ................. | G06Q 10/107 726/22 |
| 2011/0077022 A1* | 3/2011 | Scovill | ................. | H04L 41/12 455/456.1 |
| 2011/0126184 A1* | 5/2011 | Lisboa | ................. | G06F 17/30265 717/169 |
| 2013/0070650 A1* | 3/2013 | McFarland | ......... | H04L 12/1818 370/259 |
| 2013/0179949 A1* | 7/2013 | Shapiro | ................. | H04L 51/12 726/4 |
| 2014/0280630 A1* | 9/2014 | Torgersrud | ............. | H04L 67/22 709/206 |
| 2017/0270627 A1* | 9/2017 | Hodge | ............. | H04M 3/42221 |

* cited by examiner

*Primary Examiner* — Julio R Perez
(74) *Attorney, Agent, or Firm* — Fogarty LLP

(57) ABSTRACT

Systems and methods for managing communications based upon location information associated with electronic files exchanged during the communications are described. In some embodiments, a method may include intercepting an electronic file exchanged during an electronic communication; identifying location information representative of a physical location where the electronic file was created or edited; and applying, based upon the location information, a selected one of a plurality of processing rules to at least one of: the electronic communication or the electronic file.

18 Claims, 9 Drawing Sheets

MANAGING COMMUNICATIONS BASED UPON LOCATION INFORMATION ASSOCIATED WITH ELECTRONIC FILES EXCHANGED DURING THE COMMUNICATIONS

TECHNICAL FIELD

This specification relates generally to telecommunications, and, more particularly, to systems and methods for managing communications based upon location information associated with electronic files exchanged during the communications.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including videoconferences and online chat sessions.

To enable these various types of communications, a jail or prison may install or otherwise deploy communication and/or media access devices in different parts of the facility. Such communication and/or media access devices are generally used to enable inmate communications, but may also be used for other purposes.

SUMMARY

Embodiments disclosed herein are directed to systems and methods for managing communications based upon location information associated with electronic files exchanged during the communications. In an illustrative, non-limiting embodiment, a method may include: intercepting an electronic file exchanged during an electronic communication; identifying location information representative of a physical location where the electronic file was created or edited; and applying, based upon the location information, a selected one of a plurality of processing rules to at least one of: the electronic communication or the electronic file.

In various implementations, the electronic communication may be a voice, video, or text communication. Moreover, the electronic file may be a picture, a movie, an audio file, or a document. In some cases, the location information may be different from any current physical location of any communication device used in the electronic communication. The location information may include at least one of: latitude, longitude, city, or state.

Additionally or alternatively, the method may include detecting a geo-fence violation by any communication device used in the electronic communication; and intercepting the electronic file in response to the detection. Additionally or alternatively, the method may include selecting the processing rule in response to an identification of a party to the electronic communication. Additionally or alternatively, the method may include selecting the processing rule in response to the location information indicating a geo-fence violation.

In some cases, applying the selected processing rule to the electronic communication may include monitoring or recording the communication. Additionally or alternatively, applying the selected processing rule to the electronic file may include storing a copy of the electronic file.

Furthermore, in some situations, the communication may be between an inmate of a correctional facility and a non-resident of the correctional facility. As such, the method may further include selecting the processing rule in response to the location information matching a location-of-interest associated with the inmate and stored in a correctional facility database.

In various embodiments, one or more of the techniques described herein may be performed by one or more computer systems. In other various embodiments, a hardware memory device may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

Figure 1:
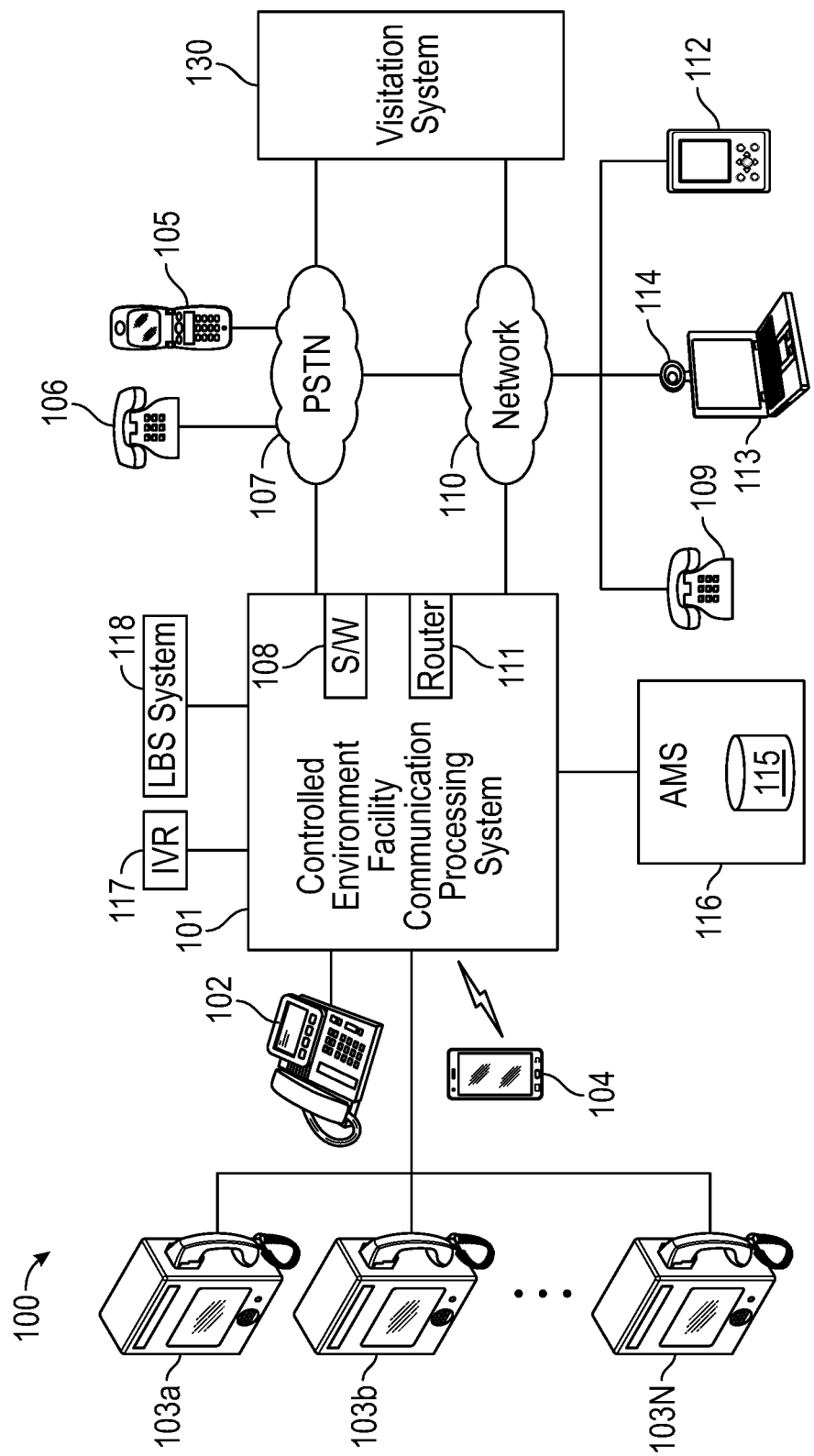
FIG. 1 is a diagram of an example of a system for developing, deploying, and/or providing location-based controls for remote visitation in controlled-environment facilities according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Various types of controlled-environment facilities are used in today's society, and persons may be voluntary or involuntary residents of those facilities, whether temporarily or permanently. Examples of controlled-environment facilities include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, schools, barracks, etc.), and the like.

Systems and methods described herein may be applicable to any type of controlled-environment facility and its residents. For convenience of explanation, however, various examples herein are discussed in the context of correctional facilities. In some examples, a controlled-environment facility may be referred to as a correctional facility, jail, or prison, and its residents may be referred to as inmates, arrestees, or detainees.

Among other types of controlled-environment facilities, correctional facilities stand out in that it can still present numerous, unique difficulties in areas such as security, surveillance, financial transactions, communications, visitation, investigation, budgets, etc.; which in turn make technological implementations uniquely challenging in those environments. Often, technologies that are used outside of correctional facilities are not immediately applicable to the correctional environment without significant changes and modifications. Moreover, correctional facilities may have specific needs that are not particularly relevant outside of those environments. As such, some of the systems and methods described herein may be specifically tailored to address one or more of the aforementioned needs and challenges.

This specification relates generally to techniques for managing communications based upon location information associated with images exchanged during the communications. In some applications, these systems and methods may be applied to any type of communication involving residents and non-residents of controlled-environment facilities.

Turning now to FIG. 1, a block diagram of an example of a controlled-environment facility 100 is depicted according to some embodiments. As shown, communication processing system 101 provides telephone services, videoconferencing, online chat, email, and other communication services to controlled-environment facility 100 (e.g., a correctional facility).

In some cases, communication system 101 may be co-located with controlled-environment facility 100. Alternatively, communication system 101 may be centrally or remotely located with respect to one or more controlled-environment facilities and/or may provide communication services to multiple controlled-environment facilities. More generally, however, it should be noted that communication system 101 may assume a variety of forms, and may be configured to serve a variety of facilities and/or users, whether within or outside of controlled-environment facility 100.

In the context of a correctional facility, for instance, inmates may use telephones 102 to access certain communication services. In some cases, inmates may also use a personal computer wireless device 104 (e.g., a tablet or cell phone) to access such services. For example, an inmate may initiate telephone services by lifting the receiver on telephone 102, at which time the inmate may be prompted to provide a personal identification number (PIN), other identifying information or biometrics. An interactive voice response (IVR) unit 117 may generate and play prompts or other messages to inmates on devices 102 and/or 104.

Under the control of communication processing system 101, devices 102 and 104 may be capable of connecting to a non-resident's (i.e., a person not committed to a controlled-environment facility) device 105 or telephone 106 across Publicly Switched Telephone Network (PSTN) 107. For example, device 105 may be a mobile phone, whereas telephone 106 may be located at a non-resident's home, inmate visitation center, etc. Switch 108 in communication processing system 101 may be used to connect video visitation sessions or calls across PSTN 107. Additionally or alternatively, the non-resident may be at telephone 109 or device 112, which is on an Integrated Services Digital Network (ISDN), Voice-over-IP (VoIP), or packet data network 110, such as, for example the Internet. Router 111 of communication system 101 is used to route data packets associated with a video visitation session or call connection to destination telephone 109 or device 112.

Video visitation devices 103a-n (each collectively referred to as "video visitation device 103") may have video conferencing capabilities to enable inmates to participate in video visitation sessions with non-residents of the correctional facility via video call, secure online chat, etc. For example, a non-resident party may have a personal or laptop computer 113 with camera 114 (or a cell phone, tablet computer, etc.). Additionally or alternatively, device 112 may have an integrated camera and display (e.g., a smart phone, tablet, etc.).

A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards. Generally speaking, each video visitation device 103 may be disposed in a visitation room, in a pod, kiosk, etc.

In addition to providing certain visitation and communication operations, communication processing system 101 may attempt to ensure that an inmate's calls, video conferences, online chats, etc. are performed only with non-residents whose identities, devices, email addresses, phone numbers, etc. are listed in that inmate's Pre-Approved Contact (PAC) list. Each inmate's PAC list may be stored, for example, in database 115 maintained by Administration and Management System (AMS) 116.

In some embodiments, a PAC list may identify each person approved to communicate with a given inmate, as well as a relationship between that person and the inmate (e.g., friend, attorney, spouse, child, parent, cousin, uncle, aunt, etc.). In addition to PAC list(s), AMS 116 may also store inmate or Resident Profile Data or RDP (e.g., full name, date and place of birth, residence(s), etc.), as well as any visitation rules applicable to each inmate. Database 115 may also include other personal information about each inmate.

As an example, still in the context of a correctional facility, database 115 may include information such as balances for inmate trust and calling accounts; litigation and judicial hearing schedule; conviction data (e.g., indicating the gravity of a crime); past criminal record; sentencing data, time served, time remaining to be served, and release date; cell and cellmate assignments; inmate restrictions and warnings; commissary order history; video visitation history; video recordings; telephone call history; call recordings; known or suspected gang or criminal affiliations; known or suspected affiliates, accomplices, or gang members; and any other information that may be relevant or useful to correctional facility staff to house and maintain inmates.

For example, database 115 may include, for each inmate, one or more geographical zones of interest—e.g., places that likely contain evidence against the inmate or its accomplices. These zones may have boundaries arbitrarily drawn on a geographical map. Additionally or alternatively, a zone of interest may be circular with a center (e.g., latitude and longitude, building, city, etc.) and a radius, or it may have other regular geometric shape (e.g., a square). Additionally or alternatively, the geographical zone of interest may be a section of a road, street, or highway—suspected to be used as a criminal activity corridor (e.g., drug smuggling, human trafficking, etc.). Additionally or alternatively, the geographical zone of interest may be a public transportation area (e.g., airport, bus station, train station, docks, etc.).

Generally speaking, database 115 may include any suitable type of application or data structure that may be configured as a data repository. For example, database 115 may be configured as one or more relational databases that include one or more tables of columns and rows and that may be searched or queried according to a query language, such SQL or the like. Alternatively, database 115 may be configured as structured data stores that include records formatted according to a markup language, such as XML or the like. In other embodiments, database 115 may be implemented using one or more arbitrarily or minimally structured files managed and accessible through a corresponding type of application.

Visitation system 130 may be configured to provide, schedule, and manage visitation services to residents and non-residents of a controlled-environment facility. To that end, visitation system 130 may be coupled to PSTN 107 and/or network 110 in a manner similar to communication processing system 101 by also including one or more gateways, switches and/or routers (not shown). Accordingly, visitation system 130 may be configured to communicate with one or more residents of the controlled-environment facility via devices 102-104 and with one or more non-residents via devices 105, 106, 109, 112, and/or 113. Although visitation system 130 is shown in FIG. 1 as being remotely located with respect to communication processing system 101 and the controlled-environment facility, in other cases visitation system 130 may be co-located with the facility and/or integrated within system 101.

In some implementations, communication system 101 may be configured to perform video visitation monitoring operations configured to monitor and or record video visitations (e.g., as electronic video files). In scenarios where communication system 101 is located within the controlled-environment facility, it may have direct access to AMS 116. In other embodiments, however, communication system 101 may be located remotely with respect to the controlled-environment facility, and access to AMS 116 may be obtained via a computer network such as, for example, network 110.

In some cases communication system 101 may facilitate communications between communication devices via one or more carriers or intermediate service providers. An example of such a carrier or provider is a video relay service (VRS) provider. A VRS, also sometimes known as a video interpreting service (VIS), is a service that allows deaf, hard-of-hearing and speech-impaired (D-HOH-SI) individuals to communicate over video telephones and similar technologies with hearing people in real-time, via a sign language interpreter. In the United States, VRS services are regulated by the U.S. Federal Communications Commission (FCC).

In some embodiments, video visitation devices 103 may be implemented as computer-based systems. For example, each of video visitation devices 103 may include a display, camera, and handset. The display may be any suitable electronic display such as, for example, a Liquid Crystal Display (LCD), a touchscreen display (e.g., resistive, capacitive, etc.), or the like, whereas the camera may be a suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone).

During a video visitation session, video visitation devices 103 may be configured to capture a video image of an inmate to be transmitted to a non-resident using the camera, and to display a video image of the non-resident to the inmate using the display. Video visitation devices 103 may also be configured to capture an audio signal from the inmate to be transmitted to a non-resident using the mouthpiece portion of the handset, and to provide an audio signal from the non-resident to the inmate using the earpiece portion of the handset. Additionally or alternatively, audio received from the non-resident may be reproduced via a loudspeaker, and audio provided by the inmate may be captured via a microphone.

In some cases, video visitation devices 103 may assume the form of any computer, tablet computer, smart phone, etc., or any other consumer device or appliance with videoconferencing capabilities.

Figure 2:
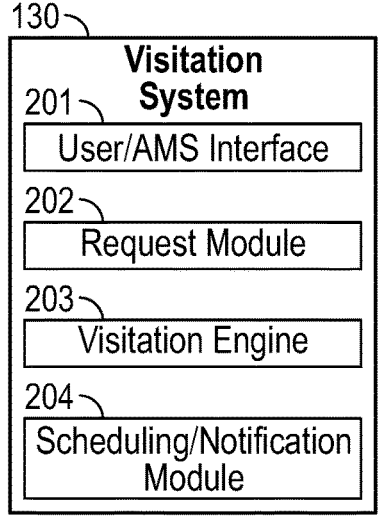
FIG. 2 is a diagram of an example of a visitation system according to some embodiments.

Referring to FIG. 2, a block diagram of visitation system 130 for providing visitation services to residents and non-residents of a controlled-environment facility is depicted according to some embodiments. As shown, visitation system 130 includes user and/or AMS interface 201. In some embodiments, residents and/or non-residents of one or more controlled-environment facilities may access, interact with, or otherwise use visitation system 130 via interface 201. For example, interface 201 may be provided as a web interface, IVR interface, or the like. Visitation system 130 may also interact with one or more AMS systems 116 either directly or via a computer network such as the Internet 110 using interface 201.

In some scenarios, a resident and/or non-resident may connect to visitation system 130 via interface 201. For example, the resident and/or non-resident may directly or indirectly (e.g., through an officer or personnel of the controlled-environment facility) reach a computer terminal or a telephone disposed within a controlled-environment facility and request visitation services. In other scenarios, the resident and/or non-resident may interact with interface 201 via PSTN 107 using an IVR system or the like. Additionally or alternatively, the resident and/or non-resident may access interface 201 via a website, webpage, Internet portal, etc. via a computer network or Internet 110, for example, using a personal computing device (e.g., running a web browser), cell phone (e.g., via an "app"), prison terminal, or any other suitable client device.

When implemented to support web-based interactions, interface 201 may be deployed using a number of suitable techniques. For example, interface 201 may be implemented using Hypertext Markup Language (HTML), Common Gateway Interface (CGI), Javascript, PHP, Perl, C/C++, or any suitable combination of these or other commercial, open source and/or proprietary languages, frameworks or development environments for generating and distributing web-based information. Further, in some implementations, request and response data may be exchanged between a client and visitation system 130 through the use of messages or documents formatted in eXtensible Markup Language (XML) or other platform-independent data format.

For example, in some embodiments, a web services request to provide visitation services may be embodied in an XML document including fields identifying the person(s) that will be participating in the visitation, the type, time, and/or duration of the visitation, and possibly other fields, in which each field is delimited by an XML tag describing the type of data the field represents. In other implementations, web services-related documents may be transmitted between applications making requests and targeted web services using a web-based data transfer protocol, such as a version of the Hypertext Transfer Protocol (HTTP), for example.

In addition to interface 201, visitation system 130 includes visitation request module 202, visitation engine 203, and visitation scheduling/notification module 270. Visitation request module 202 may be configured to receive one or more visitation scheduling requests, modification requests, or cancellation requests, for example, via interface 201.

Visitation engine 203 may be configured to execute an incoming request, for example, by facilitating a voice, video, and/or electronic connection to take place between one or more residents and one or more non-residents. In some implementations, visitation engine 203 may be configured to identify that the resident and non-resident requesting to have an electronic communication are a parent and his child by consulting AMS 116 via interface 201.

In some cases, visitation engine 203 may be configured to record and store a parent-child communication and flag in a recording database. Additionally or alternatively, visitation engine 203 may facilitate the participation of a counselor in the parent-child communication in real-time.

Visitation scheduling/notification module 204 may be configured to schedule a new visitation and/or notify a relevant party (e.g., resident, non-resident, counselor, etc.) of the new visitation. Scheduling/notification module 204 may also be configured to modify a previously scheduled visitation and/or notify a relevant party of the modification, or cancel a previously scheduled visitation and/or notify a relevant party of the canceled visitation.

In some embodiments, visitation engine 203 may be configured to store a plurality of rules usable by request module 202 and/or scheduling/notification module 204 during the course of their respective operations. For example, visitation engine 203 may store one or more scheduling rules that allows (or prohibits) certain persons to perform a visitation scheduling operation. Those rules may be applied to incoming visitation requests by visitation request module 202. Also, engine 203 may include other rules regarding notifications or conflict resolution operations that may be employed by scheduling/notification module 204.

In various implementations, the systems shown in FIG. 1 may be used to provide location-based controls of video visitation sessions or calls. For example, using spacial or location information of wireless, portable, or mobile devices, such as when an inmate calls a cell phone or other wireless device, the systems of FIG. 1 may store and trigger alert events based on the device's spacial, physical, or geographic location (e.g., latitude/longitude, carrier, cell sector, tower triangulation, Global Positioning System (GPS) coordinates, IP address information, etc.).

Spacial information may be used, for example, for law enforcement or investigation purposes. For instance, Location-Based Services (LBS) system 120 and/or location engine 401 may be configured to make positive identification that a phone number is a wireless phone or other portable device, an identification of the carrier providing service to that mobile device, the billing name and address (BNA) registered to the device, the GPS coordinates of the device at the time of a video visitation session or call (longitude and latitude), the cell sector and tower information and triangulation (e.g., if GPS is not available, using closest three wireless towers to GEO fence signal), and IP address of the mobile device, as well as a margin or level of uncertainty of the device's determined physical location.

Using spacial or location information, controlled environment facility 100 (or a service provider serving that facility) may be able to make decisions regarding how to handle a video visitation session or call from an inmate, determine whether to connect the video visitation session or call based on distance between the non-resident and the facility, how to rate the video visitation session or call based on cell phone location (e.g., using actual location instead of BNA to arbitrage long distance calls to cell phone numbers), trigger alerts if a video visitation session or call is placed into (or outside of) a pre-determined geographical area, provide interactive investigative tools to show where video visitation sessions or calls are connecting based on physical location in addition to BNA (e.g., using mapping technology and if warranted or court-ordered), provide real-time spacial or location to law enforcement (such as to find an escapee or a drug smuggling deal), etc.

In some embodiments, LBS system 118 may be configured to enable a called party to opt in/opt out by way of disclaimers at the beginning of communications they receive from inmates, identify called party wireless information, verify that a called party's phone number is a wireless number, identify the called party's wireless carrier, latitude and longitude, BNA, etc. LBS system 118 may also be configured to establish a geo-fence configured to allow video visitation sessions or calls, or to deny video visitation sessions or calls for security reasons, or to trigger alert(s) when the called party's location is within a pre-configured geographic region (i.e., in violation of one or more geo-fence rules).

Furthermore, LBS system 118 may be configured to facilitate the creation of Call Detail Records (CDRs), to generate CDR reports reflecting wireless information and easy-to-view interactive map of location and geo-fence information, to implement payment capabilities to charge for the added investigative capabilities logic of geo-fencing, and to map called party coordinates using actual physical or geographic location information.

In some cases, investigators may set up a phone number, an inmate account, a specific phone, a geographical location within or outside of facility 100, a location within facility 100, or a combination thereof to trigger an alert when used. For instance, when a selected inmate places a video or phone call and/or when a predetermined mobile device is called, LBS system 118 may trigger an alert to an investigator. The alert may be triggered, for example upon the investigator having established a physical or geographical location to and/or from which the inmate may not communicate.

Additionally or alternatively, LBS system 118 may allow a law enforcement officer or investigator to upload a warrant or court order and receive location information real time based on a phone number, IP address, or the like. Additionally or alternatively, a communication may be rated based on true location termination, a decision to either allow or deny a video visitation session or call based on the proximity to the corrections facility, and a mobile device's location may be tracked at the beginning, end, and/or throughout the video visitation session or call to provide driving or moving patterns on a map or the like.

Figure 3:
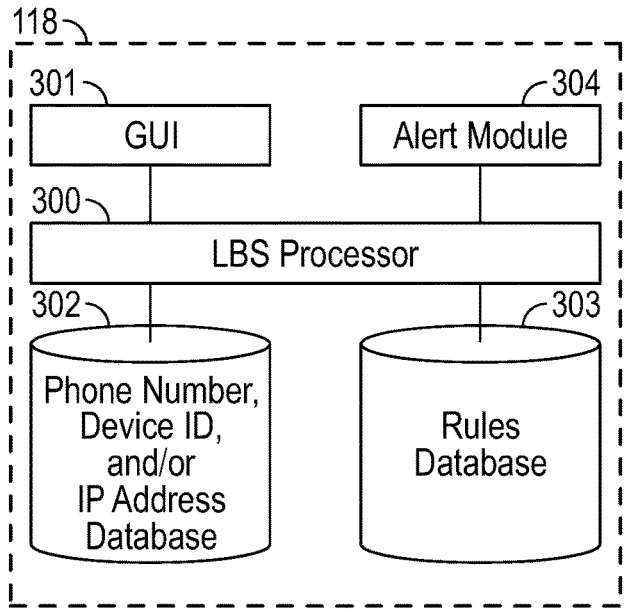
FIG. 3 is a diagram of an example of a Location-Based Services (LBS) system according to some embodiments.

FIG. 3 is a block diagram of LBS system 118 according to some embodiments. As shown, LBS system 118 includes LBS processor 300 operably coupled to Graphical User Interface (GUI) module 301, alert module 304, phone number, device ID (e.g., Media Access Control or "MAC" address, etc.), and/or IP address database 302, and rules database 303.

In operation, LBS processor 300 may receive a request (e.g., from a resident of a facility 100 through communication processing system 101) to establish a remote communication with a mobile device (e.g., 108*a-n* and/or 112*a-n*) operated by a non-resident of the facility and it may allow or deny the request depending, at least in part, upon whether the non-resident has previously provided an authorization to disclose a physical and/or geographical location of the mobile device. For instance, LBS processor 300 may receive the request and consult database 302 to determine whether the called device is a mobile device and/or whether the non-resident registered to that device is the person operating that device.

GUI module 301 may be used to allow one or more users to interact with LBS system 118 to access databases 302 and/or 303, manage registered devices and/or authorizations, create or modify location-based rules, view alerts, etc. Examples of location-based rules include querying or "pinging" rules, and geo-fencing rules. For instance, LBS processor 300 may allow a user (e.g., prison staff, investigator, etc.) to access and/or manage rules database 303 via GUI module 301. Examples of screenshots that may be generated by GUI module 301 are discussed in FIGS. 9-11 below.

Particularly, rules database 303 may include one or more processing rules that, when executed, determine how many queries should be sent to the mobile device during the communication, at what times queries should be sent, with which frequency, in response to which events or type of communication, etc.

Additionally or alternatively, rules database 303 may include one or more geo-fencing rules that, if violated (e.g., a called number is outside an allowed geographic area and/or within a forbidden area), cause alert module 304 to generate and/or transmit an alert to one or more selected persons (e.g., by phone, email, text message, etc.).

Figure 4:
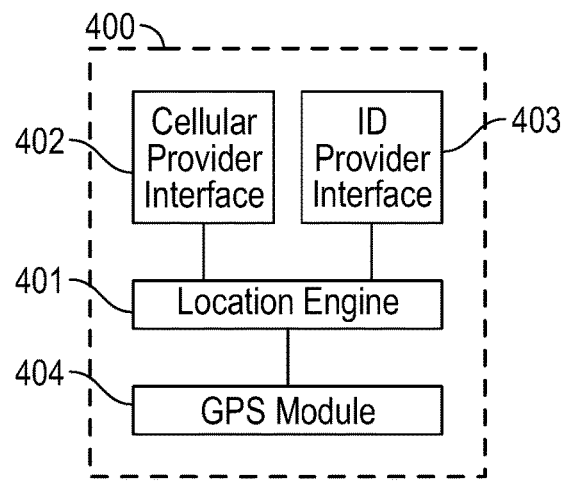
FIG. 4 is a diagram of an example of a location processor according to some embodiments.

FIG. 4 is a diagram of software 400 executable by LBS processor 300, according to some embodiments. As illustrated, location engine 401 is operably coupled to cellular provider interface 402, IP provider interface 403, and GPS module 404. In operation, location engine 401 may receive an instruction, message, or command from LBS processor 300 requesting the physical location of a given communication device.

If the device is being served by a wireless carrier, then cellular provider interface 401 may be used to query the wireless carrier for physical information of the device (e.g., cell ID, sector ID, etc.). Conversely, if the device is being served by an ISP (e.g., over a wired or wireless connection), then IP provider interface 403 may be used to query the ISP for physical information of the device (e.g., IP address, etc.).

In some embodiments, elements of location engine 401 may be at least in part integrated into a communication device, in which case GPS module 404 may provide the device's coordinates (i.e., latitude and longitude). When receiving latitude and longitude directly from wireless providers or ISPs, location engine 401 may identify range of accuracy or margin of uncertainty, for example, based on carrier type and available information.

For instance, tier 1 carriers may provide an exact latitude and longitude accurate within a couple meters, whereas for non-tier 1 carriers the accuracy may be within miles (e.g., if the technology is based on three closest cell towers). Upon retrieving the physical location information through one or more of modules 401-404, location engine 401 may fulfill the original request and transmit the device's spacial or location to communication processing system 101.

In some embodiments, modules or blocks shown in FIGS. 2-4 may represent processing circuitry and/or sets of software routines, logic functions, and/or data structures that, when executed by a processor, perform specified operations. Although these modules are shown as distinct logical blocks, in other embodiments at least some of the operations performed by these modules may be combined into fewer blocks. For example, in some cases, databases may be combined. Conversely, any given one of modules 201-204 and/or 401-404 may be implemented such that their operations are split among two or more logical blocks. Although shown with a particular configuration, in other embodiments these various modules or blocks may be rearranged in other suitable ways.

Figure 5:
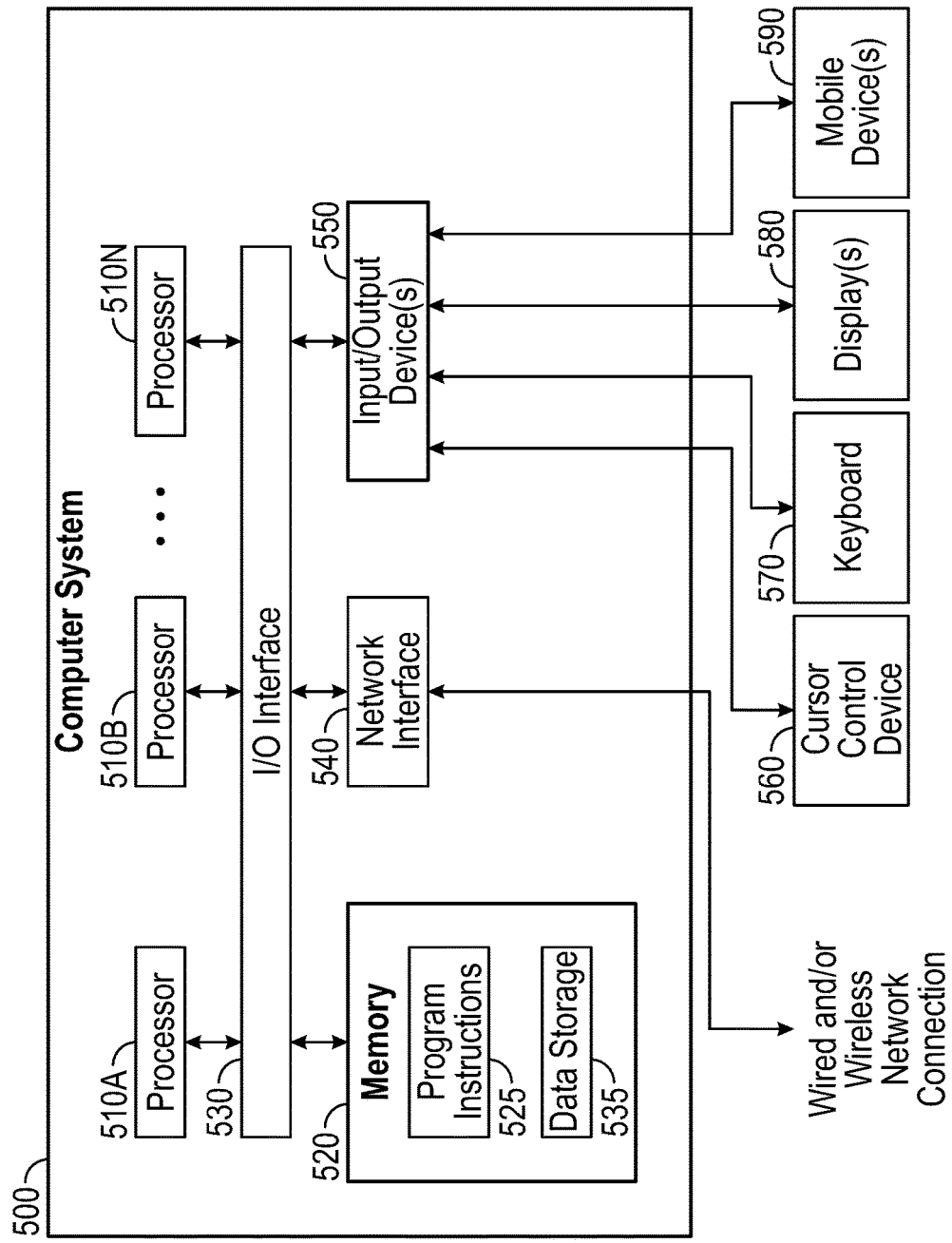
FIG. 5 is a diagram of an example of a computer system configured to implement various systems and methods described herein according to some embodiments.

As noted above, embodiments of systems and methods described herein may be implemented using one or more computer systems, and one such system is illustrated in FIG. 5. System 500 may be a server, a workstation, a desktop computer, a laptop, a tablet computer, a mobile device, a smart phone, or the like.

In some cases, system 500 may be used to implement communication system 101, IVR 117, LBS system 118, and/or one or more communication devices. For example, devices 102-105, 112, and 113 may be implemented as dedicated processor-based, electronic devices similar to computer system 500. Additionally or alternatively, these devices may be implemented as integrated components of computer system 500 (e.g., as part of a tablet computing device or the like).

Computer system 500 includes one or more processors 510A-N coupled to a system memory 520 via an input/output (I/O) interface 530. Computer system 500 further includes a network interface 540 coupled to I/O interface 530, and one or more input/output devices 450, such as cursor control device 460, keyboard 470, display(s) 480, or mobile device(s) 490. Other devices may include, for example, surveillance cameras, microphones, antennas/wireless transducers, phone detection modules, etc. In some embodiments, each of communication system 101, LBS system 118, location engine 401, visitation system 130 and/or one or more of devices 103-106 and 109-113 may be implemented using a single instance of computer system 500, while in other embodiments multiple such systems, or multiple nodes making up computer system 500, may be configured to host different portions of a given electronic device or system.

In various embodiments, computer system 500 may be a single-processor system including one processor 510, or a multi-processor system including two or more processors 510 (e.g., two, four, eight, or another suitable number). Processors 510 may be any processor capable of executing program instructions. For example, in various embodiments, processors 510 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 510 may commonly, but not necessarily, implement the same ISA. Also, in some embodiments, at least one processor 510 may be a graphics processing unit (GPU) or other dedicated graphics-rendering device.

System memory 520 may be configured to store program instructions and/or data accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described below in connection with FIGS. 6-12, may be stored within system memory 520 as program instructions 525 and data storage 535, respectively.

In other embodiments, program instructions and/or data may be received, sent or stored upon different types of computer-accessible media or on similar media separate from system memory 520 or computer system 500. Generally speaking, a computer-accessible medium may include any tangible storage media or memory media such as electronic, magnetic, or optical media—e.g., disk or CD/DVD-ROM coupled to computer system 500 via I/O interface 530. Program instructions and data stored on a tangible computer-accessible medium in non-transitory form may further be transmitted by transmission media or signals such as electrical, electromagnetic, or digital signals, which may be conveyed via a communication medium such as a network and/or a wireless link.

In one embodiment, I/O interface 530 may be configured to coordinate I/O traffic between processor 510, system memory 520, and any peripheral devices in the device, including network interface 540 or other peripheral interfaces, such as input/output devices 450. In some embodiments, I/O interface 530 may perform any necessary protocol, timing or other data transformations to convert data signals from one component (e.g., system memory 520) into a format suitable for use by another component (e.g., processor 510).

In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. In addition, in some embodiments some or all of the functionality of I/O interface 530, such as an interface to system memory 520, may be incorporated directly into processor 510.

Network interface 540 may be configured to allow data to be exchanged between computer system 500 and other devices attached to a network, such as other computer systems, or between nodes of computer system 500. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, mobile devices, or any other devices suitable for entering or retrieving data by one or more computer system 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

Memory 520 may include program instructions 525, configured to implement certain embodiments described herein, and data storage 535, comprising various data may be accessible by program instructions 525. In an embodiment, program instructions 525 may include software elements of embodiments illustrated in the above figures. For example, program instructions 525 may be implemented in various embodiments using any desired programming language, scripting language, or combination of programming languages and/or scripting languages (e.g., C, C++, C#, Java™, JavaScript™, Perl, etc.). Data storage 535 may include data that may be used in these embodiments (e.g., recorded communications, profiles for different modes of operations, etc.). In other embodiments, other or different software elements and data may be included.

A person of ordinary skill in the art will appreciate that computer system 500 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

In some embodiments, the various systems described above may operate such that, when an inmate places a remote communication through communication processing system 101, a lookup may be performed (e.g., by LBS system 118 and/or location engine 401) into a web service that identifies that the remote communication is to a cell phone or other mobile device, acquire and store the related information, and make a decision if the remote communication is allowed to be connected or not. For example, a first web service call may be used for determining if the remote communication is to a cell phone or mobile device and providing the related information, and a second web service call may be used to gather and process any geo-fencing rules. Moreover, these service calls may be performed in real-time or near real-time.

In some cases, LBS system 118 and/or location engine 401 may be able to process special numbers if configured as geo-fence exempt. Also, LBS system 118 may play appropriate audio messages to the called party and track their acceptance to the terms and conditions (e.g., through IVR system 117) for receiving a video visitation request or call from (or placing a video visitation request or call to) an inmate at a facility that has geo-fencing enabled.

Figure 6:
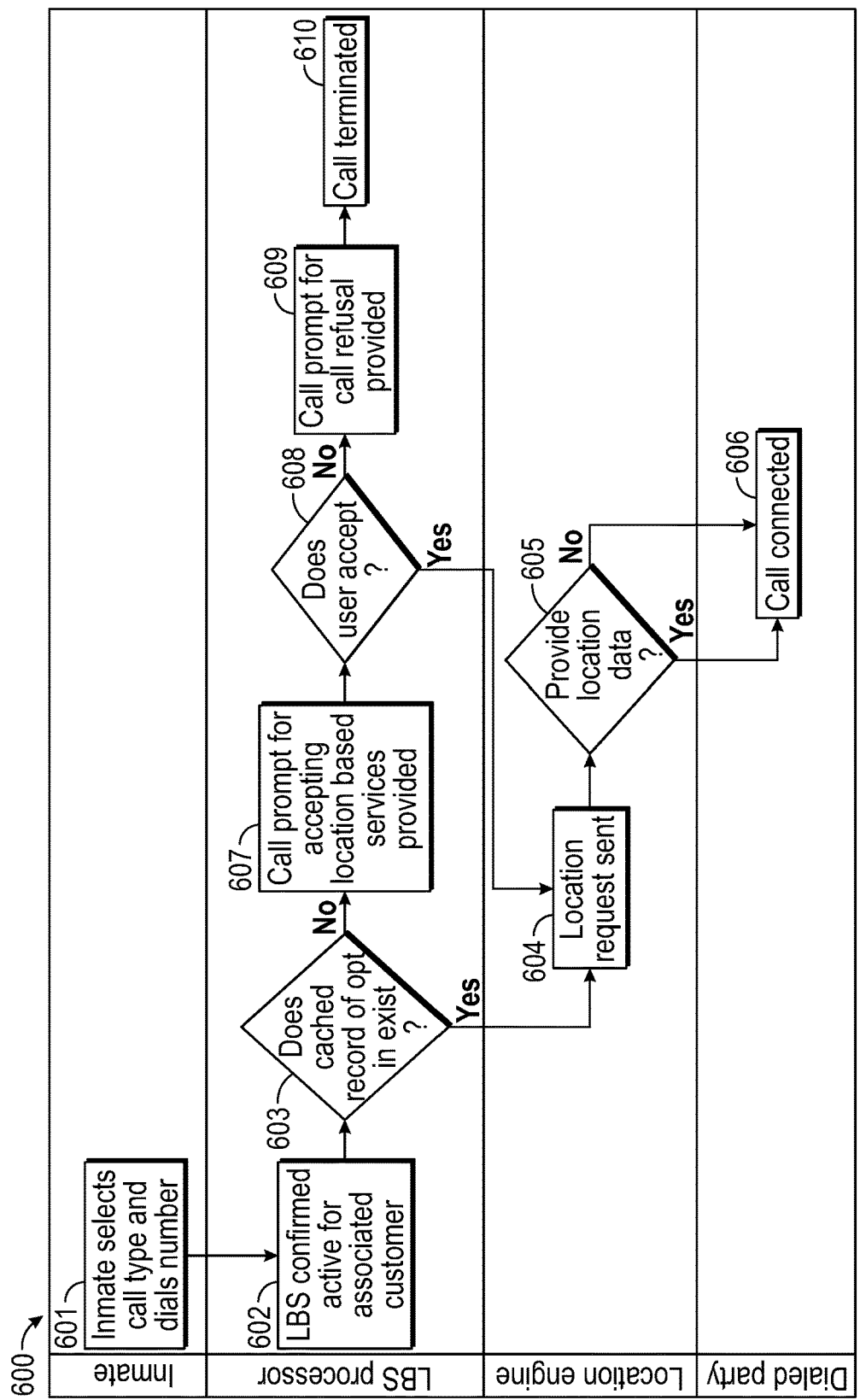
FIG. 6 is a diagram of an example of a method for providing Location-Based Services (LBS) remote visitation session or call processing according to some embodiments.

FIG. 6 is a flowchart of method 600 of LBS video visitation session or call processing. In some embodiments, method 600 may be performed, at least in part, by LBS system 118 of FIG. 1. At block 601, method 600 may allow an inmate of facility 100 to select a remote communication type (e.g., PSTN, VoIP, etc.) and dial a phone number or otherwise select a mobile device of a non-resident (e.g., using the non-resident's name, username, email address, device ID, MAC address, etc.). This operation may be implemented, for example, via IVR system 117 or the like.

At block 602, LBS processor 113 may confirm that LBS services are active for the associated facility 100 or the associated non-resident. For example, LBS system 118 may inspect database 202 and determine that the called device is in fact a mobile device. Additionally or alternatively, LBS system 118 may query location engine 401 to make this determination. At block 603, method 600 may (optionally) identify whether there exists a record of a previous authorization or consent by the non-resident to have the physical or geographic location of his or her mobile device tracked by facility 100 (e.g., by consulting database 202).

At block 604, if a previous and non-expired authorization is found, LBS system 118 and/or location engine 401 may (optionally) transmit a request for the mobile device's spacial or location information (e.g., to carrier 107, ISP 111, and/or via GPS module 303). At block 605, method 600 determines whether the queried entity (e.g., carrier 107, ISP 111, etc.) was able to provide the device's spacial or location information.

In some embodiments, regardless of the outcome of 605, the remote communication is established at block 606. However, if the device's spacial or location information is available, LBS system 118 may also be configured to add that information to a CDR created for that communication. Also, in other embodiments, the communication may be denied if the device's spacial or location information is not available (e.g., in situations involving high-risk inmates and/or non-residents). In some cases, block 606 may also charge an account of the inmate and/or non-resident for a telecommunication provider's fees associated with providing the spacial information. Additionally or alternatively, these extra charges may be imposed at another suitable time during the execution of method 600.

At block 607, if a previous and current authorization is not found, LBS system 118 and/or location engine 401 may provide the non-resident with a prompt for accepting LBS services (e.g., via IVR system 117). If the non-resident agrees at block 608, control passes to block 604. Otherwise, a call prompt refusing to establish the remote communication may be provided at block 609, and the communication may be terminated at block 610.

In some embodiments, LBS system 118 may allow users to specify a phone number as "covert monitor" without providing consent to the called party and/or without the called party even operating the device or receiving a call. This feature may be useful, for example, if facility 100 is required by a court order or warrant to track a called party's cell phone number regardless of that party receiving or placing a video visitation session or telephone call to or from an inmate. Moreover, LBS system 118 may include "send to phone" capabilities that forward the location coordinates of a violating communication to an investigator's cell phone (e.g., via text message or email) with mapping information.

Figure 7:
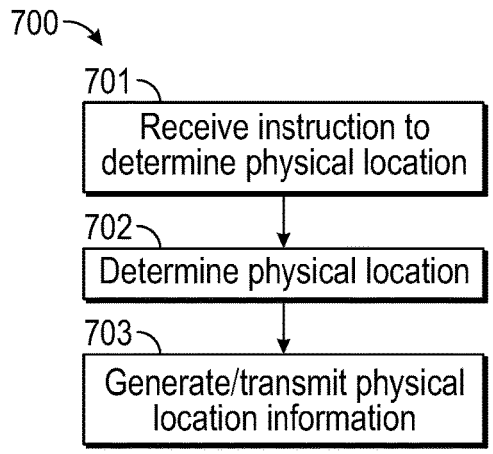
FIG. 7 is a diagram of an example of a method of determining a mobile device's physical location according to some embodiments.

FIG. 7 is a flowchart of a method of determining a mobile device's physical location. In some embodiments, method 700 may be performed, at least in part, by location engine 401 of FIG. 4.

At block 701, method 700 may receive an instruction (e.g., as a web service call from LBS system 118) to determine a physical location of a particular mobile device. At block 702, location engine 401 may issue a query to at least one or more carriers, ISPs, and/or GPS 303 to retrieve the requested information. For example, in some cases, the instruction may include an electronic authorization given by the non-resident operator of the mobile device, which may in turn allow a wireless carrier or ISP to provide the device's spacial or location to location engine 401. A carrier may track the physical location of mobile device using GPS, an E911 system, cell tower triangulation, or other system.

At block 703, location engine 401 may generate and/or transmit physical or geographic location information to LBS system 118. In some embodiments, location engine 401 may further determine, calculate, or estimate a margin of uncertainty associated with the spacial or location information depending upon the source of the information (e.g., by type of carrier, etc.) and transmit that additional information to LBS system 118.

Figure 8:
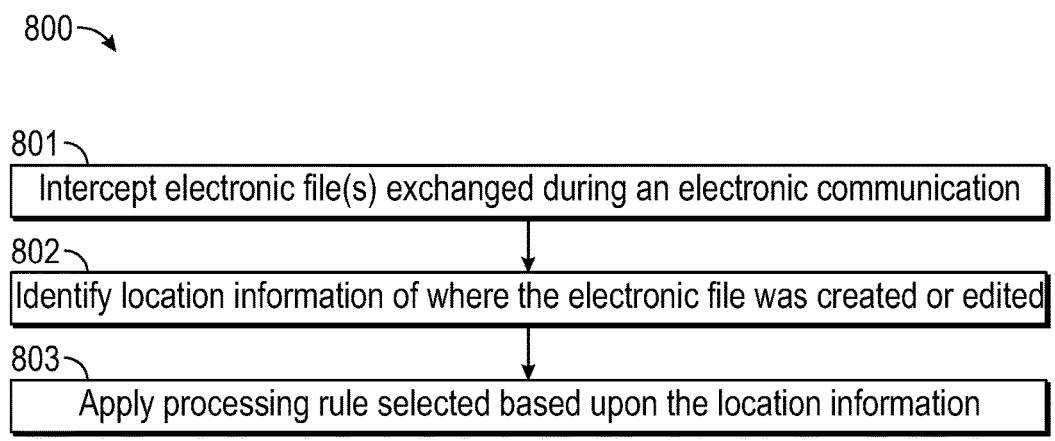
FIG. 8 is a diagram of an example of a method for location-based control of images transmitted during communication sessions according to some embodiments.

FIG. 8 is a flowchart of method 800 for querying location information from mobile communications devices. In some embodiments, method 800 may be implemented, at least in part, by LBS processor 300 of FIG. 3. As shown, at block 801, method 800 may intercept or identify an electronic communication between two or more parties. For example, the electronic communication may be a voice, video, or text communication.

At least one of the parties may be using a mobile communication device. In some cases, the mobile communication device may have a built-in camera system and/or memory storing the electronic file. The electronic file may be, for example, a picture, a movie, an audio file, or a document.

At block 802, method 800 may identify location information associated with the location where the electronic file was created or edited. For example, a digital image stored in one the communication devices involved in the electronic communication may have been associated with a geographical location by a geo-tagging process prior to the communication, for example, in connection with the image's creation or editing.

The acquisition of the location information, at the time of creation or subsequent editing of electronic file, may be done, for example, by a GPS system, sometimes within the communication device participating in the communication. The location information may include a latitude and longitude to the image, and optionally altitude, compass bearing etc. Additionally or alternatively, location information may include other location references such as city, state, or the like.

In many applications, location information associated with an electronic file may be different or independent from the current location of the communication device used to transmit that file during the communication session. For example, a party may transmit an electronic image to another party via a messaging application as part of a text or messaging session, but after having obtained that image with the same (or another) communication device. As such, the location information of the image referred to in block 802, which in this case was obtained at the time the image was captured, would be different from the current location information of the device at the time of the communication or transmission.

In some implementations, location information of the mobile device itself (distinct from the file's location information described in block 802) may be used to determine whether to execute block 801. In some implementations, block 801 may operate in response to detection of a first geo-fence violation by any mobile communication device used in the electronic communication. Such a first geo-fence violation, in this implementation, refers to the location of the mobile device—that is, if the mobile device violates a location restriction, block 801 may intercept the communication and/or the file being transferred. The first geo-fence violation may also be, for instance, a non-allowed direction of travel or trajectory of a party to the communication.

At block 803, method 800 applies a processing rule selected based upon the location information. The processing rule may apply to the communication itself and/or to the electronic file being transferred. In some implementations, a processing rule may include another geo-fence restriction (referred to as a "second geo-fence" in contradistinction with the first geo-fence of block 801), and one or more commands associated with that restriction.

In some implementations, each of a plurality of processing rules may be stored in rules database 303. The selecting (or the identifying of the selected one) of the plurality of processing rules may be performed in response to the identification of a called party party to the communication (e.g., by name or phone number). Additionally or alternatively, the selecting (or the identifying of the selected one) of the plurality of processing rules may be performed in response to an identification of the called party (e.g., by name or phone number). Additionally or alternatively, the selecting (or the identifying of the selected one) of the plurality of processing rules may take place in response to an identification of the mobile device (e.g., a media access control (MAC) address, an International Mobile Equipment Identity (IMEI), a serial number, etc.

In operation, the processing rule may detect a violation associated with a second geo-fence restriction. For example, method 800 may determine whether the location information of the electronic file violates or is in compliance with applicable geo-fencing rule(s). Examples of geo-fencing rules include, but are not limited to, one or more areas or materials to which a party to the communication should not have access. For example, in the case of correctional facilities, these processing rules may selected in response to an identification of the: inmate, non-resident, status of the inmate, location with the facility, type of communication (e.g., cellular vs. IP), type of electronic file, size of the file, and/or it may be device-specific.

With respect to the second geo-fence restriction of the processing rule, physical or geographic areas may be defined in a linear fashion (e.g., west/east of a given longitude or north/south of a given latitude), a circular fashion (e.g., latitude and longitude of a center point plus a radius), by Zone Improvement Plan (ZIP), by area code, by city, county, state, etc.).

As noted above, each processing rule of block 803 may also include one or more commands that are issued in response to the detection of a geo-fence violation by virtue of the location of the creation or editing of the electronic file transfer (as opposed to a violation by the communication device itself). In some cases, such commands may include instructions for monitoring or recording the communication. Additionally or alternatively, applying the selected processing rule to the electronic file may include storing a copy of the electronic file.

As previously noted, in some embodiments, method 800 may be deployed in connection with a correctional facility or the like, and the resident may be prisoner or inmate. In such cases, block 803 may identify the selected processing rule based upon inmate information stored in a correctional facility database, such as AMS 116. For example, the inmate information may include conviction data or criminal affiliation.

In some cases, LBS processor 300 may allow for communications to disconnect when the location information of the electronic file is within geo-fence proximity. In other cases, LBS processor may allow the communication to proceed despite any rule violation, but it may change the processing rules to stay more (or less) informed about the communication depending upon those violations. Additional corrective action may include, for example, recording the communication, providing a live-monitoring feed of the communication to an investigator or prison staff, etc.

In various embodiments, GUI module 301 of LBS system 118 may provide a user interface to authorized users (e.g., investigative staff or the like). Such an interface may allow a user to view, create, and edit processing rules, call detail records, mapped spacial or location, margins of uncertainty, etc. For example, GUI module 301 may be configured to report communications taking place within a selectable proximity to one or more areas, to display one or more CRDs on a geographic map, to display a correlation between a device's BNA or physical location, against the location information of the electronic file transferred in that communication. GUI module 301 may also allow authorized users to take predetermined actions and to receive real time information through a web service.

In some embodiments, processing rules may be selected based upon the type of communication, the called or calling party, etc. Additionally or alternatively, processing rules may be dynamically selected during the course of the communication in response to the detection of geo-fence violations by the device itself (as in block 801).

Figure 9:
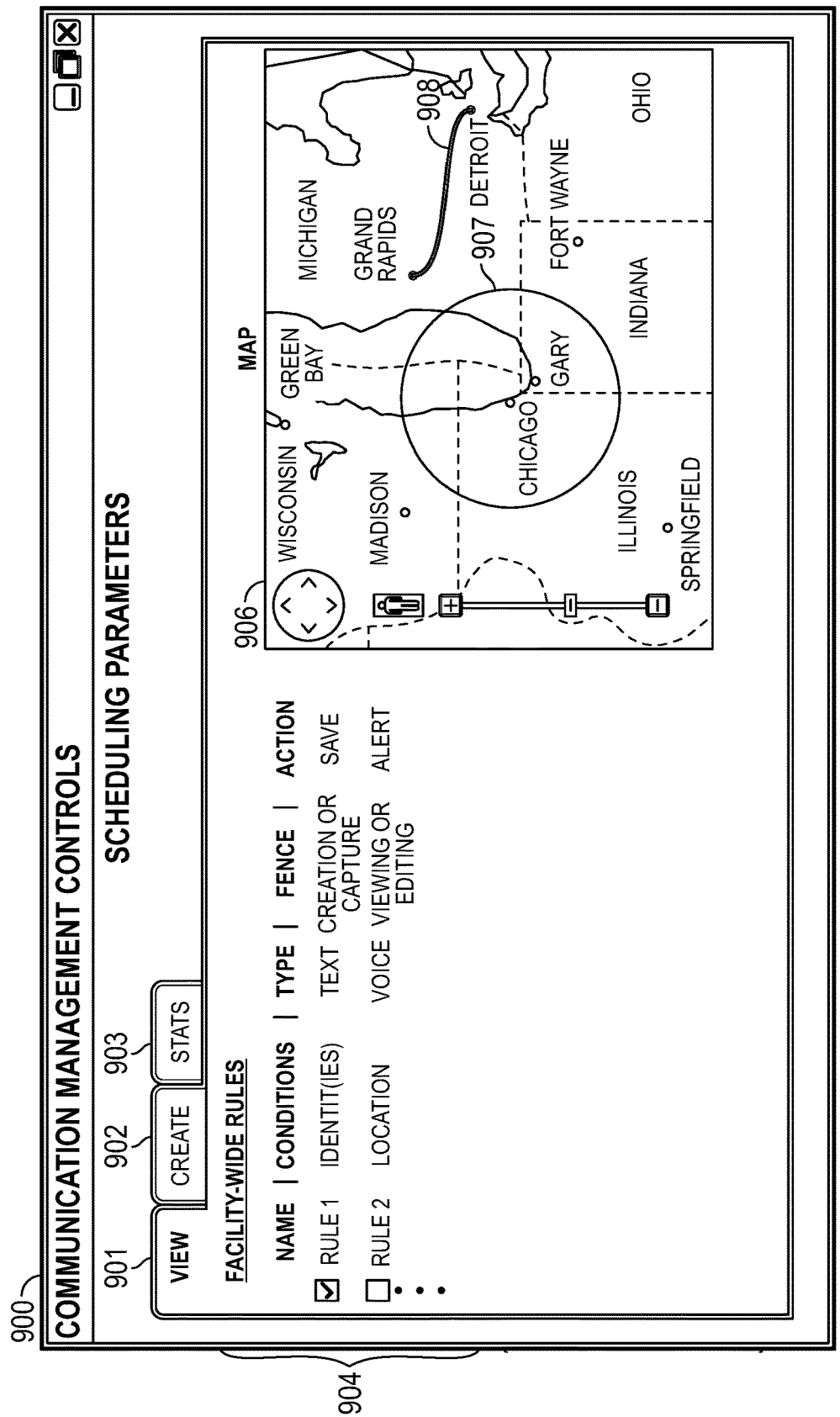
FIGS. 9-12 are diagrams of examples of an LBS system's communication management control interface according to some embodiments.
Figure 10:
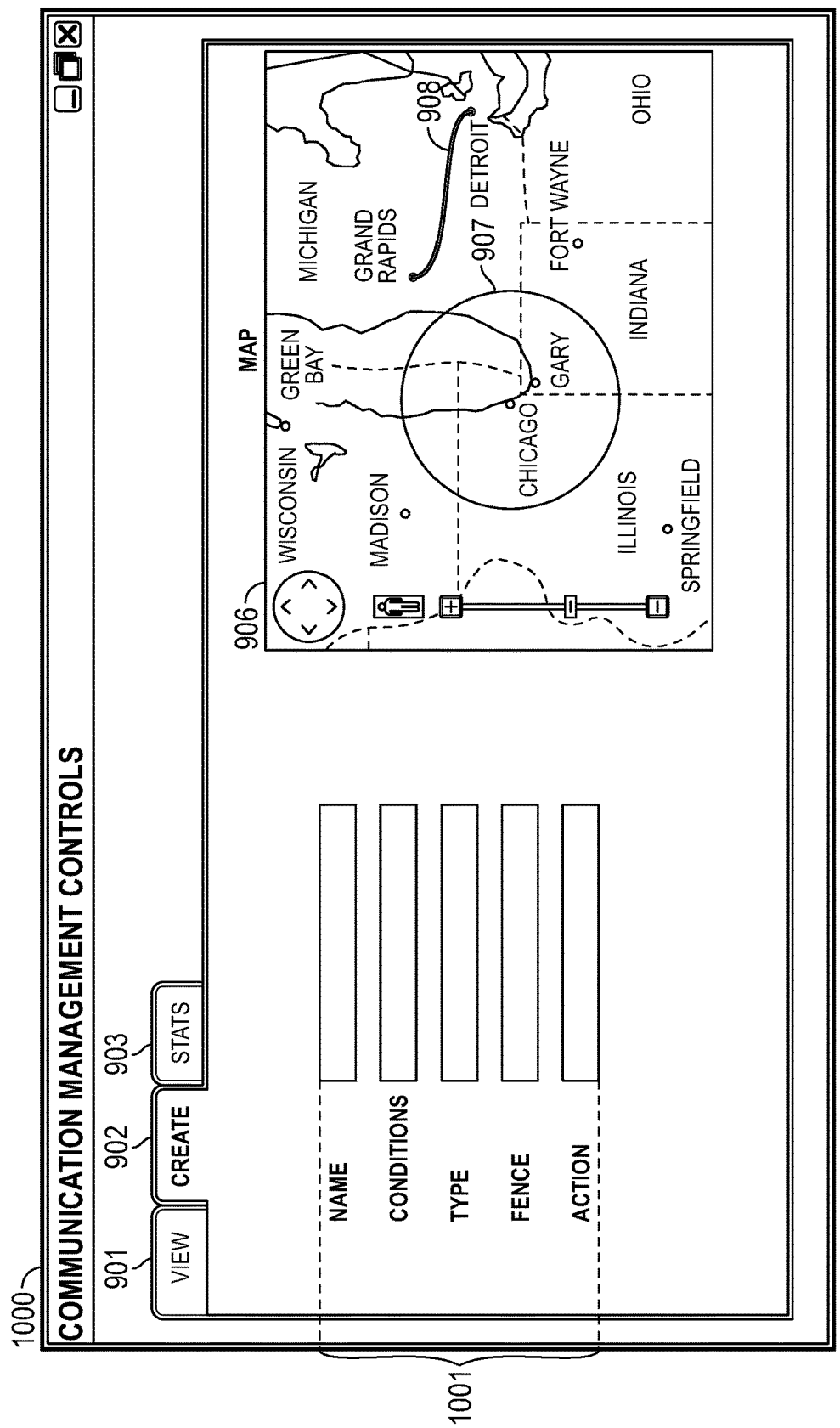
Figure 11:
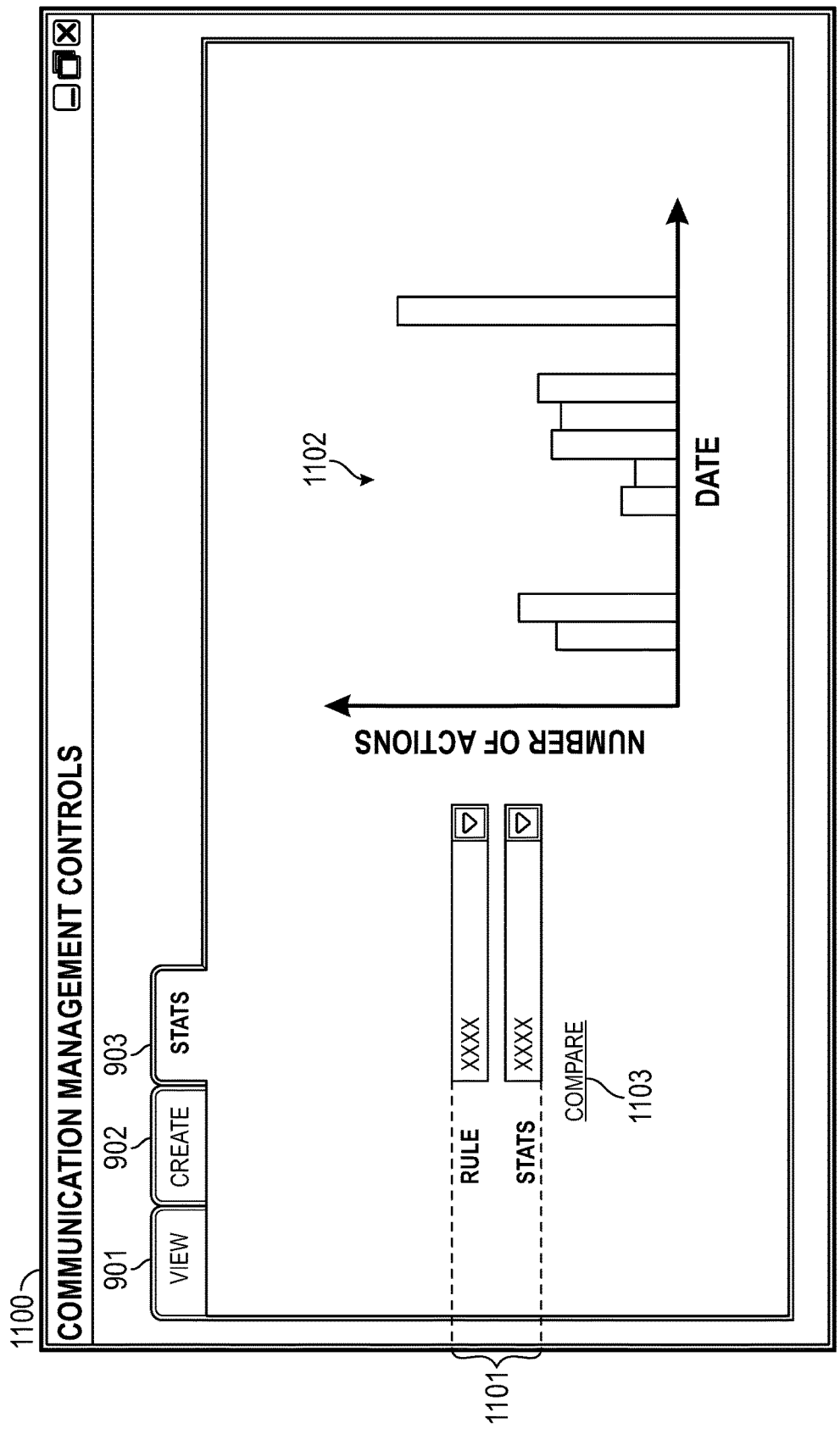

FIGS. 9-11 are rendered screenshots 900-1100 of an LBS software application that may be produced by GUI module 301 according to some embodiments. In various implementations, the software application may be cloud or web-based, although in other implementations the application may be a stand-alone, executable program.

As illustrated, three "tabs" 901-903 provide an authorized user with processing rules' viewing, creation, and statistics options. In FIG. 9, "view" tab 901 is selected, thus allowing a user to view outstanding processing rules 904. These processing rules may be facility-wide rules and/or individual rules 904 that are applicable to individual inmates or subgroups of inmates (e.g., known gangs, etc.).

For example, for each rule 904 stored in database 303, one or more of the following may be provided: a name of the rule, conditions under which the rule is selected (e.g., identities of called or calling parties, location information of a communication device, etc.) the type of communication (e.g., voice, video, text), one or more geo-fence parameters (e.g., media file creation/capture restrictions or viewing/editing restrictions), and one or more commands or actions associated with the processing rule (e.g., copying or saving the file, monitoring the communication, alerting investigative authorities, etc.)

Examples of other information that may be added to a processing rule include, but are not limited to: a description of the rule; a status of the rule (e.g., active, inactive, etc.); an address, city, state, ZIP code, latitude, longitude, radius, diameter, length, or measurement or a region associated with the rule; a start time, start date, end time, and end date for the rule; an identification of a person or persons who created the rule and its date of creation; the name of an author or authors of one or more previous rule modification and the date of such modifications; an indication of whether the rule is private or shared; etc.

Still referring to FIG. 9, a map portion 906 of screenshot 900 may provide a geographic indication of the location of the called party during the communication. Upon detection of an electronic file exchanged during a communication, map 906 may render location information for that communication and for the electronic file, and GUI may identify the processing rule(s) being applied. In some cases, map 906 may also render boundary 907 and path 908. For example, boundary 907 may refer to a geo-fence restriction applicable to the electronic file, and path 908 may refer to an actual location of a mobile communication device during the communication.

In FIG. 10, screenshot 1000 shows "create" tab 902 selected by a user, thus allowing the user to enter or edit one or more fields for one or more processing rules. Again, map portion 906 may automatically represent geo-fences 907 and 908, covered by processing rules overlaid upon a geographic map. Furthermore, the size, type, length, and location of geo-fences 907 and 908 may be updated continuously and/or in response to a modification of fields 1001. In some cases, geo-fences may be circular or square-shaped, dynamic shape, by ZIP code, highway, or corridor. A geo-fence may also identify whether it is positively or negatively defined (i.e., whether a mobile device may receive a call only if within a selected area, or only if outside of that area), etc.

Moreover, map portion 906 may be interactive and the investigator may manipulate or pinpoint the locations on the map in order to generate or create the geo-fencing rule, thus automatically updating the rule displayed in portion 1001.

In FIG. 11, screenshot 1100 shows "statistics" tab 903 selected by a user, thus enabling the user to obtain information regarding the execution of one or more processing rules. For example, the user may select one or more rules and desired statistics at 1101, and a corresponding graph 1102 may be rendered.

Examples of statistics include, but are not limited to: a number of communications tracked, a number of electronic files intercepted, a number of alerts issued, etc. These statistics may be presented by date, time, inmate, non-resident, phone number or device ID, etc. In some embodiments, a "compare" button or hyperlink 1103 may allow the user to combine statistics of two or more rules or communication on a single graph (e.g., in different colors), for example. Also, the user may select one or more elements on graph 906 to display or show CDRs with spacial or location information for one or more video visitation sessions or calls affected by the selected processing rule(s).

It should be noted that, although the examples shown in FIGS. 9-11 describe a user interface based on "tabs," other implementations may utilize any other suitable navigational or operational tools. For example, in other embodiments, GUI module 301 may provide user interface(s) based upon one or more menus (e.g., hierarchical menus), hyperlinks, web pages, worksheets, buttons, etc. More generally, it should be understood that the screenshots of FIGS. 9-11 are presented only by way of illustration, and not limitation.

Figure 12:
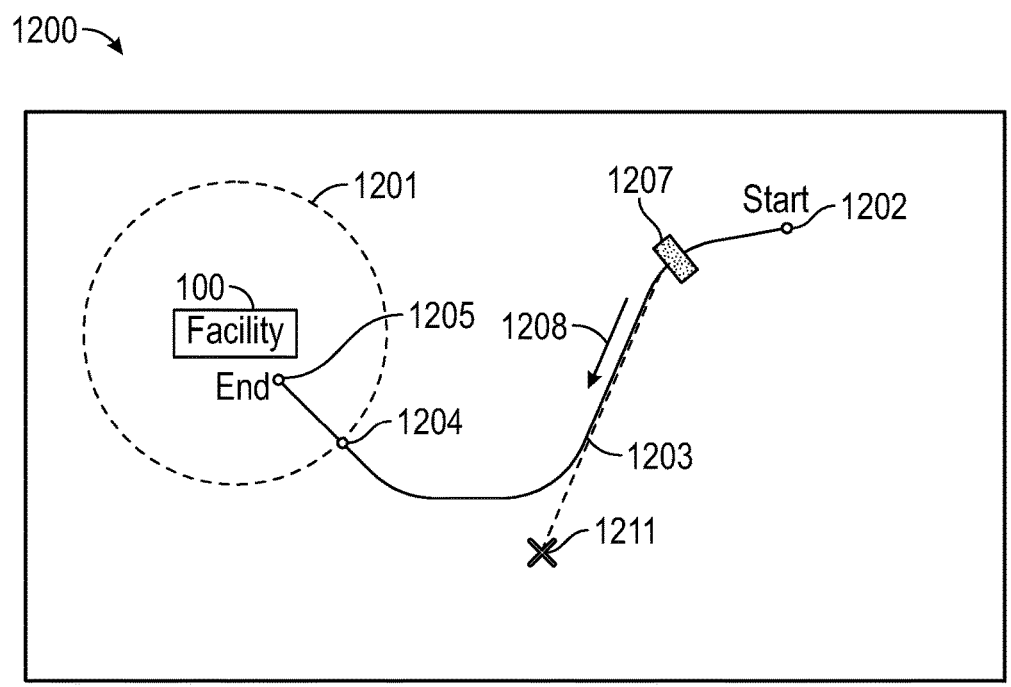

FIG. 12 shows screenshot 1200 illustrating an example of a map according to some embodiments. Specifically, correctional facility 100 may be shown along region 1201 depicting certain operational aspects of a processing rule.

In this example, a non-resident party receives or initiates a communication session or a call with a mobile device at a starting position 1202. Along with point 1202, this mapping feature may also display a dialog box that indicates the device ID or called party ID, the calling party ID, the actual physical or geographic location of the mobile device, and the duration of the video visitation session or call at that point (i.e., 00:00 in this case). A dialog box may also indicate a physical distance between point 1202 and facility 100 and/or region 1201.

As the communication progresses, the map feature(s) of FIG. 12 may render trajectory 1203 of the mobile device as the non-resident party physically moves. An initial ping schedule for issuing location information requests may be invoked, sometimes at the outset of the communication, location information of the device itself may be continuously or periodically obtained that way thereafter.

In this case, the processing rule describes location-of-interest 1211 as location restriction for electronic file exchanged during the communication. For example, location-of-interest 1201 may be a location associated with the inmate and stored in a correctional facility database. The location may include the place of suspected criminal activity. Additionally or alternatively, the location may be that of a correctional facility, for example, in case the electronic file contains information regarding a potential escape or contraband information at that location. If a file is exchanged during the communication, a selected processing rule determines whether the file was created, viewed, or modified at the location-of-interest 12011 (or near it, within a selected quantifiable margin). If not, the electronic file transfer is allowed; otherwise a command may be issued to take corrective action.

At point 1204, the location of the mobile device of the non-resident violates another geo-fence 1201 (applicable to the device, but not necessarily to the electronic file). After that, a different processing rule may apply to electronic files being transferred. For example, so long as the mobile device is in violation of geo-fence 1201, no file transfers may be allowed at all. Moreover, in some cases, different rules may be applied to different types of communications.

In some embodiments, sliding cursor 1207 may allow an investigator to retrace trajectory 1203 and determine the location the non-resident party was during each portion of the call. In cases the communication is recorded, for instance, the cursor may be synchronized with the audio recording or text exchange to facilitate review. Moreover, trajectory 1203 may include an indication of a location where the electronic file was created or edited, and/or a location of where the electronic file was transferred between the two devices during the communication.

In some cases, when the investigator replays an audio or video recording, sliding cursor 1207 may move along trajectory 1203. Additionally or alternatively, sliding cursor 1207 may be used to pause, rewind or forward a record of the communication.

Dialog boxes with aforementioned video visitation session or call information may be displayed at predetermined points of trajectory 1203 and/or may be displayed with cursor 1207. In various embodiments, the map feature(s) of FIG. 12 may be displayed in real-time, as the video visitation session or call progresses. Additionally or alternatively, the map feature(s) may be stored as part of a CDR or the like.

As such, these feature(s) may allow the display of true video visitation session or call termination on a map, in addition to the facility address location and the BNA location.

Direction of travel 1208 of the non-resident's communication device during the video visitation session or call may be received from a wireless carrier and/or calculated by LBS processor 300. In some cases, the highway or corridor may be used in a criminal activity associated with the resident, as indicated in AMS 116 or an input by an investigator, for example.

The various systems and methods illustrated in the figures and described herein represent example embodiments of methods for managing communications based upon location information associated with electronic files exchanged during the communications. These techniques may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising:
   intercepting an electronic file transmitted by a communication device during an electronic communication between a first person and a second person;
   identifying a physical location where the electronic file was created or edited, wherein the physical location of the electronic file is determined based on a geographic location associated with the electronic file during the creation or editing of the electronic file;
   applying a selected one of a plurality of processing rules to at least one of: the electronic communication or the electronic file, wherein the processing rules comprise one or more geographic restrictions on a location of the first person or the second person; and
   detecting a violation of the one or more geographic restrictions based on a determination that the physical location associated with the intercepted file violates a geographic restriction on the location of the first person or the second person, wherein the violation of the geographic restrictions is detected based on a projected trajectory of the communication device during the communication.

2. The method of claim 1, wherein the electronic communication is a voice, video, or text communication.

3. The method of claim 1, wherein the electronic file is a picture, a movie, an audio file, or a document.

4. The method of claim 1, wherein the physical location where the electronic file was created or edited is different from a current physical location of the communication device.

5. The method of claim 1, wherein the physical location where the electronic file was created or edited includes at least one of: latitude, longitude, city, or state.

6. The method of claim 1, further comprising selecting the processing rule in response to an identification of a party to the electronic communication.

7. The method of claim 1, further comprising:
   selecting the processing rule in response to the physical location where the electronic file was created or edited indicating the violation.

8. The method of claim 1, wherein applying the selected processing rule to the electronic communication includes monitoring or recording the communication.

9. The method of claim 1, wherein applying the selected processing rule to the electronic file includes storing a copy of the electronic file.

10. The method of claim 1, wherein the first person is an inmate of a correctional facility and the second person is a non-resident of the correctional facility.

11. The method of claim 10, further comprising:
    selecting the processing rule in response to the physical location where the electronic file was created or edited matching a location-of-interest associated with the inmate and stored in a correctional facility database.

12. A computer system, comprising:
    a processor; and
    a memory coupled to the processor, the memory having program instructions stored thereon that, upon execution by the processor, cause the computer system to:
      intercept an electronic file transmitted by a communication device during an electronic communication between a first person and a second person;
      identify a physical location where the electronic file was created or edited, wherein the physical location of the electronic file is determined based on a geographic location associated with the electronic file during the creation or editing of the electronic file;
      apply-a selected one of a plurality of processing rules to at least one of: the electronic communication or the electronic file, wherein the processing rules comprise one or more geographic restrictions on a location of the first person or the second person; and
      detect a violation of the one or more geographic restrictions based on a determination that the physical location associated with the intercepted file violates a geographic restriction on the location of the first person or the second person, wherein the violation of the geographic restrictions is detected based on a projected trajectory of the communication device during the communication.

13. The computer system of claim 12, wherein the physical location where the electronic file was created or edited is different from a current physical location of the communication device.

14. The computer system of claim 12, wherein the program instructions, upon execution, further cause the computer system to:
    select the processing rule in response to the physical location where the electronic file was created or edited indicating the violation.

15. A hardware memory device having program instructions stored thereon that, upon execution by a processor, cause a computer system to:
    intercept an image file transmitted by a communication device during a text communication between a first person and a second person;
    identify a physical location where the image file was created or edited, wherein the physical location of the electronic file is determined based on a geographic location associated with the electronic file during the creation or editing of the electronic file;
    apply a selected one of a plurality of processing rules to at least one of: the text communication or the image file, wherein the processing rules comprise one or more geographic restrictions on a location of the first person or the second person; and detect a violation of the one or more geographic restrictions based on a determination that the physical location associated with the intercepted file violates a geographic restriction on the location of the first person or the second person, wherein the violation of the geographic restrictions is detected based on a projected trajectory of the communication device during the communication.

16. The hardware memory device of claim 15, wherein the program instructions, upon execution, further cause the computer system to:
select the processing rule in response to the physical location where the image file was created or edited matching a location-of-interest associated with the first person or the second person.

17. The hardware memory device of claim 16, wherein the location of interest includes the location of a correctional facility in which at least one of the first person and the second person are inmates.

18. The hardware memory device of claim 17, wherein the location of interest includes a location pre-designated as being subject to investigation.

\* \* \* \* \*